(12) United States Patent
Luo et al.

(10) Patent No.: US 12,012,864 B2
(45) Date of Patent: Jun. 18, 2024

(54) AERO-ENGINE TURBINE ASSEMBLY

(71) Applicant: BEIHANG UNIVERSITY, Beijing (CN)

(72) Inventors: Xiang Luo, Beijing (CN); Zhe Zhang, Beijing (CN); Dongdong Liu, Beijing (CN); Zeyu Wu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 105 days.

(21) Appl. No.: 17/973,746

(22) Filed: Oct. 26, 2022

(65) Prior Publication Data

US 2023/0313686 A1 Oct. 5, 2023

Related U.S. Application Data

(63) Continuation-in-part of application No. PCT/CN2022/107744, filed on Jul. 26, 2022.

(30) Foreign Application Priority Data

Mar. 29, 2022 (CN) .......................... 202210317706.5

(51) Int. Cl.
*F01D 5/00* (2006.01)
*F01D 5/08* (2006.01)
*H02J 50/10* (2016.01)

(52) U.S. Cl.
CPC .............. *F01D 5/081* (2013.01); *H02J 50/10* (2016.02)

(58) Field of Classification Search
CPC . F01D 15/10; F01D 5/08; F01D 5/081; F01D 5/087; F01D 5/088; F01D 5/185;
(Continued)

(56) References Cited

U.S. PATENT DOCUMENTS 4,136,516 A * 1/1979 Corsmeier .............. F01D 25/12
                                                     415/116
5,782,076 A * 7/1998 Huber .................... F02C 7/224
                                                     415/115
(Continued)

FOREIGN PATENT DOCUMENTS

CN          103306742 A    9/2013
CN          112796843 A    5/2021
(Continued)

OTHER PUBLICATIONS

International Search Report Cited in PCT/CN2022/107744, Dec. 26, 2022, 5 Pages.

(Continued)

*Primary Examiner* — Matthew T Largi
(74) *Attorney, Agent, or Firm* — Cooper Legal Group, LLC

(57) ABSTRACT

Disclosed is an aero-engine turbine assembly, including a turbine assembly body and a cooling component. The turbine assembly body is provided with an internal flow passage, and the turbine assembly body includes a turbine rotor disk, a blade end wall and a turbine rotor blade, which are successively fixedly connected with each other. The internal flow passage passes through the turbine rotor disk, the blade end wall and the turbine motor blade, and the internal flow passage is provided with an inlet and an outlet. The cooling component is fixed on the turbine rotor disk, and the cooling component includes an electromagnetic pump system, an expansion joint and a radiator, which are successively communicated with each other. The electromagnetic pump system is communicated with the inlet, to inject liquid metal to into the internal flow passage.

10 Claims, 4 Drawing Sheets

(58) Field of Classification Search
CPC .......... F01D 5/082; F01D 5/181; F01D 9/041; H02J 50/10; H02K 44/06; F05D 2240/126; F05D 2240/128; F05D 2260/205; F05D 2260/213; F05D 2260/232; F05D 2260/22141
See application file for complete search history.

(56) References Cited

U.S. PATENT DOCUMENTS

| | | | |
|---|---|---|---|
| 6,295,803 B1 * | 10/2001 | Bancalari | F02C 7/08 415/114 |
| 8,789,377 B1 * | 7/2014 | Brostmeyer | F02C 7/16 60/806 |
| 9,353,687 B1 * | 5/2016 | Brostmeyer | F01D 9/065 |
| 2016/0290234 A1 * | 10/2016 | Ekanayake | F02C 7/18 |
| 2017/0159566 A1 * | 6/2017 | Sennoun | F02C 7/185 |
| 2019/0153953 A1 * | 5/2019 | Niergarth | F02C 7/141 |

FOREIGN PATENT DOCUMENTS

| | | |
|---|---|---|
| CN | 113027538 A | 6/2021 |
| CN | 113898416 A | 1/2022 |
| CN | 114673563 A | 6/2022 |
| DE | 3616712 A1 | 11/1987 |
| FR | 1356110 A | 3/1964 |

OTHER PUBLICATIONS

Written Opinion Cited in PCT/CN2022/107744, Dec. 26, 2022, 5 Pages.

\* cited by examiner

AERO-ENGINE TURBINE ASSEMBLY

CROSS-REFERENCE TO RELATED APPLICATION

The present application is a continuation of PCT application No. PCT/CN2022/107744, filed on Jul. 26, 2022, which claims the priority benefit of China application No. 202210317706.5, filed on Mar. 29, 2022. The entireties of PCT application No. PCT/CN2022/107744 and China application No. 202210317706.5 are incorporated herein by reference and made a part of this specification.

TECHNICAL FIELD

The present application relates to the technical field of aero-engine, and in particular to an aero-engine turbine assembly.

BACKGROUND

In order to improve the thrust and thermal efficiency of an aviation gas turbine engine, it is necessary to increase the turbine inlet temperature, which is a main technical measure to improve engine performance Currently, the turbine inlet temperature of an advanced engine has reached about 2200K, which will continue to be increased in the future. In such a high temperature, the thermal protection for the turbine moving blade surfaces becomes particularly important. The main measures are to adopt heat-resistant and high-temperature materials and cooling media for effective cooling.

Generally, high-pressure air from compressor outlet or intermediate stage is used as a cooling medium for cooling the vortex blades of an aero-engine, and due to the continuous increase of pre-turbine gas temperature, the cooling flow rate is also increasing. The increase of the cooling flow rate is unfavorable to the increase of engine thrust. In order to achieve the purpose of small cooling flow rate and good cooling effect, it is necessary to adopt measures to strengthen heat exchanges or block hot gas, including impingement cooling, transpiration cooling and air film cooling and so on. However, air cooling also brings some problems: firstly, in order to effectively cool the blades with limited air, the design of the blades adopts complex structures, which puts forward to higher requirements on the manufacturing process of parts and increases the manufacturing costs; secondly, the cooling air is usually drawn from the compressor, losing the power capacity so that the power capacity of the engines decreases; thirdly, the cooling air absorbs heat from main gas, which aggravates the heat loss of the main gas and decreases the work capacity of the main gas; fourthly, if the bleed air is not properly handled, it will not only increase the flow loss, but also sometimes cause the unstable flow of air.

SUMMARY

The purpose of the present application is to provide an aero-engine turbine assembly, which is configured for solving the technical problems caused by the above existing cooling methods, improving the thermal efficiency and work capacity of the engine, enhancing the cooling effect and extending the service life of the turbine assembly.

To achieve the above purpose, the present application provides the following schemes:

The present application discloses an aero-engine turbine assembly, including:

a turbine assembly body with an internal flow passage, including a turbine rotor disk, a blade end wall and a turbine rotor blade, which are successively fixedly connected with each other; the internal flow passage passes through the turbine rotor disk, the blade end wall and the turbine rotor blade; and the internal flow passage is provided with an inlet and an outlet;

a cooling component fixedly connected on the turbine rotor disk, including an electromagnetic pump system, an expansion joint and a radiator, which are successively communicated with each other; the electromagnetic pump system is communicated with the inlet, to inject liquid metal into the internal flow channel; the radiator is communicated with the outlet, to receive the liquid metal flowing out of the outlet.

Preferably, the inlet and the outlet are located on the turbine rotor disk.

Preferably, the aero-engine assembly further includes a drag reduction cover plate configured for reducing wind resistance, which is fixed on the turbine rotor disk and covers on the outside of the electromagnetic pump system and the expansion joint; a side of the drag reduction cover plate away from the turbine rotor disk has a smooth surface.

Preferably, the electromagnetic pump system is communicated with the inlet via a first connecting pipe; the radiator is communicated with the outlet via a second connecting pipe; the radiator is communicated with the expansion joint via a third connecting pipe; and the expansion joint is communicated with the electromagnetic pump system via a fourth connecting pipe.

Preferably, the internal flow passage includes a first bottom chamber, a second bottom chamber, a top chamber, an inflow blade cooling channel and an outflow blade cooling channel, which are provided inside the turbine rotor blade; the first bottom chamber and the second bottom chamber are arranged at a side of the turbine rotor blade close to the blade end wall, and the top chamber is arranged at a side of the turbine rotor blade away from the blade end wall; the first bottom chamber is communicated with the top chamber via the plurality of inflow blade cooling channel, and the second bottom chamber is communicated with the top chamber via the plurality of outflow blade cooling channel.

Preferably, the internal flow passage further includes a blade end wall inflow channel and a blade end wall outflow channel, which are arranged in the blade end wall, an outlet of the blade end wall inflow channel is communicated with the first bottom chamber, and an inlet of the blade end wall outflow channel is communicated with the second bottom chamber.

Preferably, the internal flow passage further includes a turbine rotor disk inflow channel and a turbine rotor disk outflow channel, which are arranged in the turbine rotor disk; an inlet of the turbine rotor disk inflow channel is communicated with the electromagnetic pump system, and an outlet of the turbine rotor disk inflow channel is communicated with the inlet of the blade end wall inflow channel; an outlet of the turbine rotor disk outflow channel is communicated with the radiator, and an inlet of the turbine rotor disk outflow channel is communicated with the outlet of the blade end wall outflow channel.

Preferably, the blade end wall inflow channel and the blade end wall outflow channel are both bending channels.

Preferably, the radiator is a fin radiator.

Preferably, the electromagnetic pump system includes an electromagnetic pump body, an induction power supply stationary component and an induction power supply rotating component; the induction power supply stationary component is annular and fixed on the turbine stator disk; the induction power supply rotating component is annular and fixed on the electromagnetic pump body; the induction power supply rotating component includes an induction module, and the induction module is electrically connected with the electromagnetic pump body; the induction power supply stationary component includes a power supply module, and the power supply module supplies power to the induction module by means of electromagnetic induction; the induction module supplies power to the power supply module by means of electromagnetic induction, and transmits electric energy to the electromagnetic pump body, to supply power for the electromagnetic pump body.

Compared with the prior art, the present application achieves the following technical effects:

The present application takes a liquid metal as a flowing working medium; the liquid metal enters into the internal flow passage by the electromagnetic pump system, and exchanges heat with the turbine rotor disk, the blade end wall and the turbine rotor blade to increase the temperature; then the liquid metal returns to the radiator, and dissipates heat at the radiator to reduce the temperature; and after that the liquid metal flows through the expansion joint and the electromagnetic pump system to complete the closed loop. Compared with the air cooling method, the liquid metal has better thermal conductivity, heat capacity and other comprehensive properties and has a better heat transfer capacity. When flowing in the internal flow passage, the liquid metal is able to carry away more heat, which can, on one hand, make the cold air originally configured for cooling work to improve the thermal efficiency and work capacity of the engine, and on the other hand, also can enhance the cooling effect to extend the life of the turbine assembly.

BRIEF DESCRIPTION OF THE DRAWINGS

In order to more clearly describe a technical solutions according to an embodiment of the present application or the prior art, a brief description of the drawings to be used in the embodiment. Obviously, the drawings in the following descriptions are only provided for some embodiments of the present application, and other drawings may be obtained by the ordinary persons skilled in the art from these drawings without any creative efforts.

DESCRIPTION OF THE EMBODIMENTS

The technical schemes in the embodiments of the present application will be clearly and completely described below in combination with the figures of the embodiments of the present application. Apparently, the embodiments described are only a part of the embodiments of the present application and not all of them. Based on the embodiments of the present application, all other embodiments obtained by the ordinary persons skilled in the art without creative efforts fall within the scope of protection of the present application.

The purpose of the present application is to provide an aero-engine turbine assembly, which is configured for solving the technical problems caused by the cooling methods mentioned above, improving the thermal efficiency and work capacity of the engine, enhancing the cooling effect and extending the service life of the turbine assembly.

In order to make the purpose, characteristics and advantages of the present application mentioned above, the present application will be further illustrated in detail in combination with the appended figures and specific embodiments.

Figure 1:
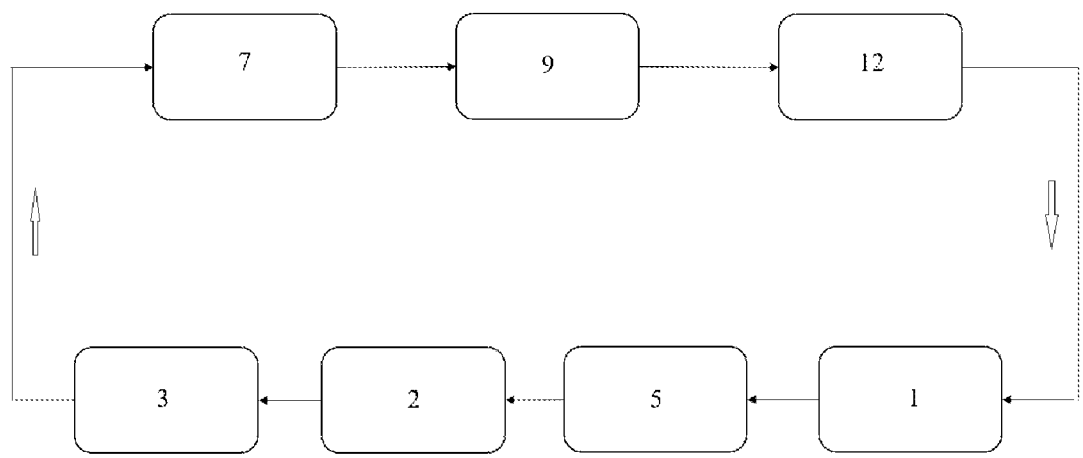
FIG. 1 is a schematic diagram showing a connection relationship of an aero-engine turbine assembly according to the present application.
Figure 2:
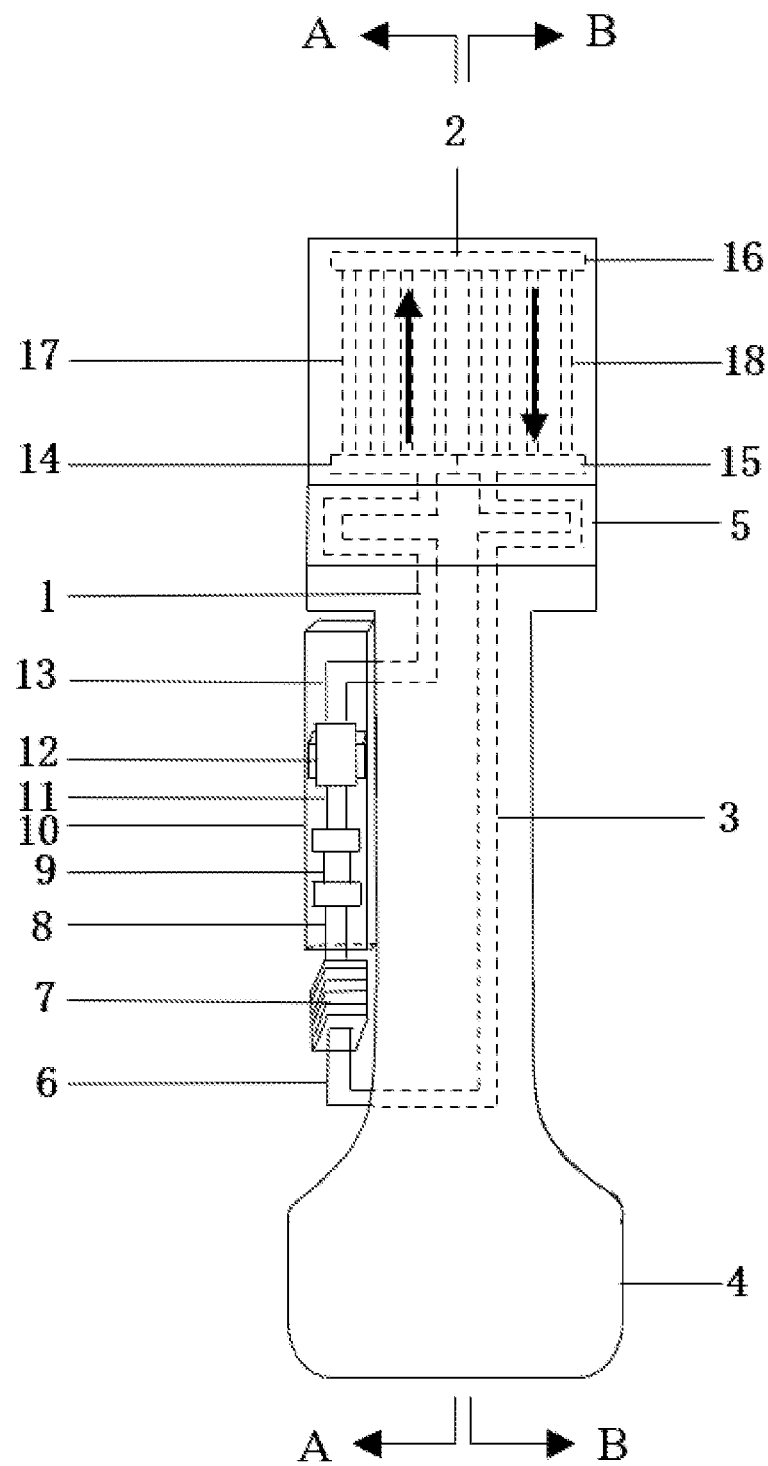
FIG. 2 is a structure diagram of an aero-engine turbine assembly according to the present application.
Figure 3:
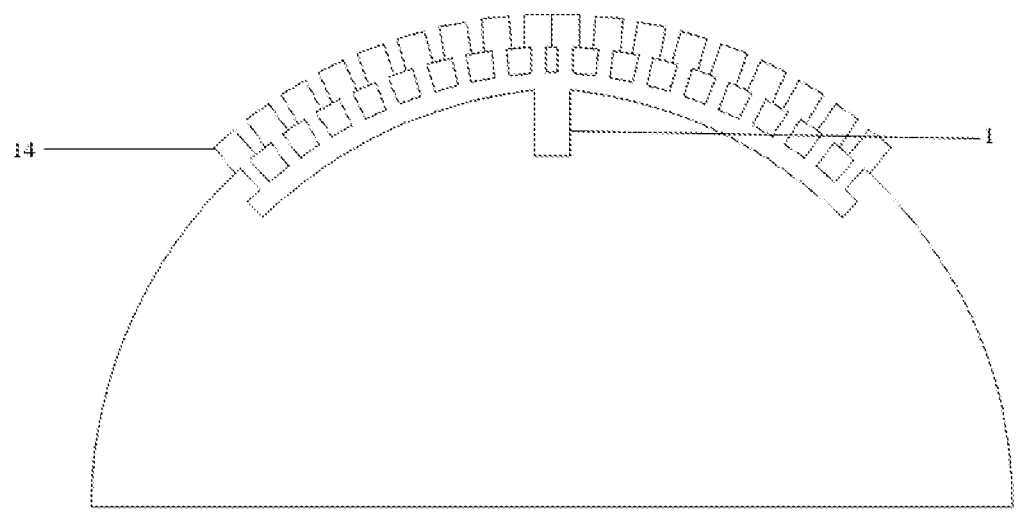
FIG. 3 is a schematic diagram of a section A-A in FIG. 2.
Figure 4:
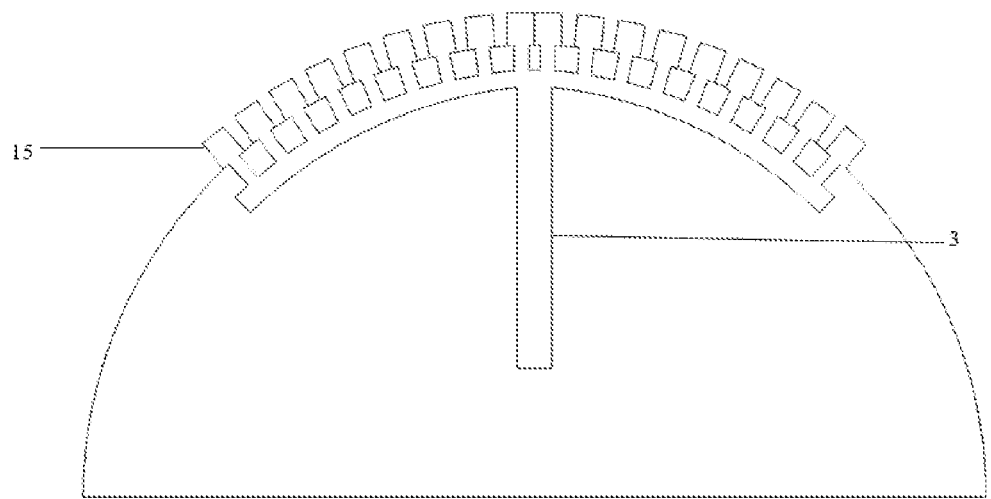
FIG. 4 is a schematic diagram of a section B-B in FIG. 2.
Figure 5:
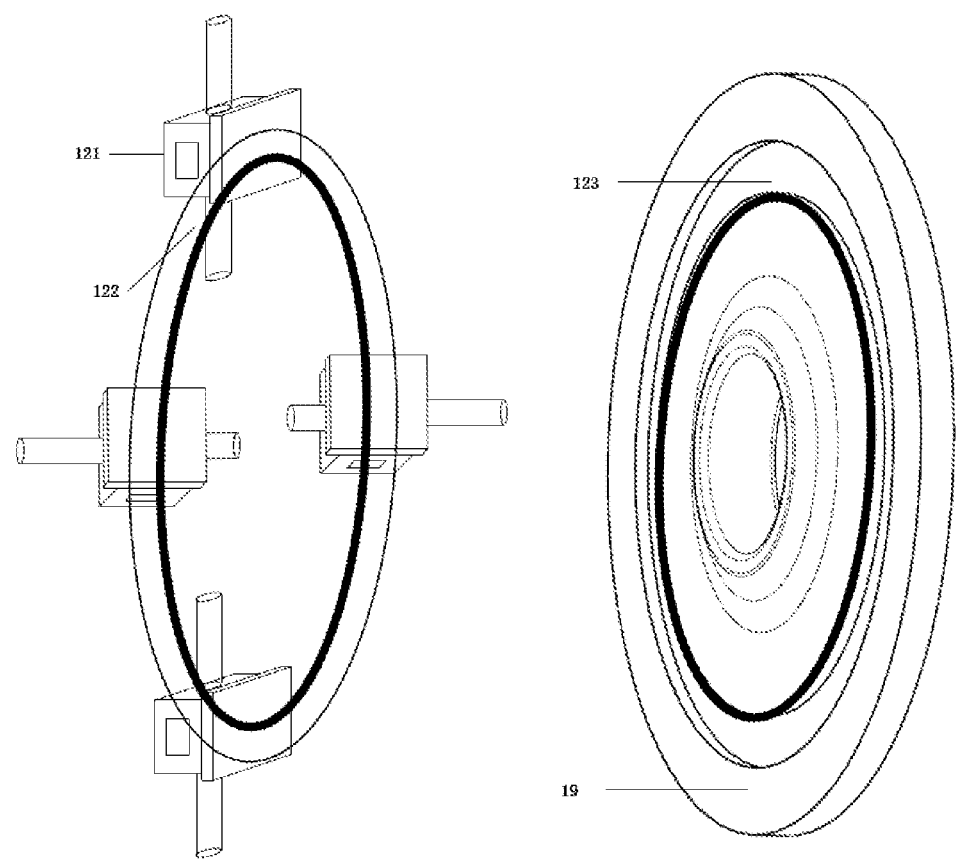
FIG. 5 is a schematic diagram showing a part structure of an electromagnetic pump system according to the present application.

Referring to FIGS. 1-5, an aero-engine turbine assembly according to the present application includes a turbine assembly body and a cooling component. Referring to FIGS. 1 and 2, the liquid metal flows along a direction as indicated by the arrow.

The turbine assembly body has an internal flow passage. The turbine assembly body includes a turbine rotor disk 4, a blade end wall 5 and a turbine rotor blade 2, which are fixedly connected with each other in sequence. The internal flow passage passes through the turbine rotor disk 4, the blade end wall 5 and the turbine rotor blade 2. The internal flow passage is provided with an inlet and an outlet. The cooling component is fixed on the turbine rotor disk 4. The cooling component includes an electromagnetic pump system 12, an expansion joint 9 and a radiator 7, which are communicated with each other in sequence. The electromagnetic pump system 12 is communicated with the inlet to inject the metal liquid into the internal flow passage. The radiator 7 is communicated with the outlet to receive the liquid metal from the outlet.

The aero-engine turbine assembly according to the present application works as follows. In this embodiment, liquid metal is used as a flowing working medium. Driven by the electromagnetic pump system 12, the liquid metal enters the internal flow passage, exchanges heat with the turbine rotor disk 4, the blade end wall 5 and the turbine rotor blade 2 to increase the temperature, returns into the radiator 7 for dissipating heat and decreasing the temperature, and passes through the expansion joint 9 and the electromagnetic pump system 12 to complete a closed loop. The expansion joint 9 is configured for compensating an axial deformation caused by metal thermal expansion, which can avoid damage of components in the aero-engine turbine assembly body due to the expansion of the internal liquid metal. Compared with air cooling, the liquid metal has a higher thermal conductivity, heat capacity and other comprehensive properties, and has more excellent heat transfer capacity. The liquid metal can carry more heat when flowing in the internal flow passage. In this way, on one hand, the cold air originally used for cooling may be used to work, which can improve the thermal efficiency and work capacity of the engine; and on the other hand, the cooling effect can be enhanced and the service life of the turbine assembly body can be extended.

In this embodiment, the liquid metal mentioned above includes, but is not limited to, gallium, which has low melting point and is meltable at room temperature, or an alloy of metal gallium and other metal such as tin, bismuth or indium. In atmosphere conditions, gallium has a very low melting point of 29.77° C. and a boiling point of 2004.8° C. The thermal conductivity of liquid gallium at its melting point is 25.2 kcal/m·h·° C., which is 1600 times that of air and 65 times that of water. The specific heat of liquid gallium at 100° C. is 0.082 cal/g·° C., which is about 370 times that of air. The absolute viscosity of liquid gallium is 1.89×10−2 g/cm·s at 529° C. and is 1.03×10−2 g/cm·s at 301° C. With these excellent characteristics, gallium is very suitable for use as a cooling medium for cooling nozzle guide blade. At room temperature, gallium is stable in the air. At a temperature above 260° C., dry oxygen can oxidize gallium, but the resulting oxidation film can prevent gallium from continuing oxidation. Thus, a gallium-based cooling device has good stability and reliability. It should be noted that gallium may form an alloy having a low melting point with many metals such as bismuth, tin and indium. For example, gallium alloy containing 8% tin has a melting point of 20° C., and gallium alloy containing 25% indium melts at 16° C. Further, a metal fluid with a wider melting point can also be obtained by using multicomponent mixtures, for example, the melting point of the multicomponent mixture containing 62.5% Ga, 21.5% In and 16% Sn is 10.8° C. An alloy containing Ga, In and Sn has a lower melting point, and the melting point of $GaIn_{25}Sn_{13}$ is as low as 5° C., which can also be used as a cooling medium with even better performance, and all of which can be used as the liquid metal in the present application. It should be noted that even if the metal liquid stops flowing, the heat can be timely transferred from the turbine assembly body to the radiator 7 by its high thermal conductivity, to realize the function of full dissipation.

The locations of the inlet and the outlet may be determined by the skilled in the art according to the actual needs, as long as the liquid metal can flow into the internal flow passage from the inlet and flow out of the internal flow passage from the outlet. In this embodiment, both the inlet and the outlet are located on the turbine rotor disk 4. Compared with the turbine rotor blade 2 and the blade end wall 5, on one hand, the turbine rotor disk 4 has a larger volume, which is more convenient to install parts on the turbine rotor disk 4; and on the other hand, the turbine rotor disk 4 is closer to the center of rotation, and the installation of parts on the turbine rotor disk 4 will bring less wind resistance.

To further decrease wind resistance, in the present application, the aero-engine turbine assembly further includes a drag reduction cover plate 10, which is configured for decreasing wind resistance. The drag reduction cover plate 10 is fixed on the turbine rotor disk 4 and covers on outside of the electromagnetic pump system 12 and the expansion joint 9. A side of the drag reduction cover plate 10 away from the turbine rotor disk 4 has a smooth surface. In order to facilitate heat exchange, the radiator 7 is preferably provided on the outside of the drag reduction cover plate 10. Based on different actual needs, the skilled in the art can choose different shapes of drag reduction cover plate 10.

In the present application, the mentioned communication may be either a direct communication, or a communication via a pipe, as long as the liquid metal can flow between the two components communicated with each other. In an implementation, the electromagnetic pump system 12 is communicated with the inlet via a first connecting pipe 13, the radiator 7 is communicated with the outlet via a second connecting pipe 6, the radiator 7 is communicated with the expansion joint 9 via a third connecting pipe 8, and the expansion joint 9 is communicated with the electromagnetic pump system 12 via a fourth connecting pipe 11.

The specific manner of setting the internal flow passage may be determined by the skilled in the art according to actual needs. In the present application, the internal flow passage includes a first bottom chamber 14, a second bottom chamber 15, a top chamber 16, an inflow blade cooling channel 17 and an outflow blade cooling channel 18, all of which are arranged in the turbine rotor blade 2. The first bottom chamber 14 and the second bottom chamber 15 are arranged at one end of the turbine rotor blade 2 close to the blade end wall 5, and the top chamber 16 is arranged at one end of the turbine rotor blade 2 away from the blade end wall 5. The first bottom chamber 14 is communicated with the top chamber 16 via a plurality of inflow blade cooling channels 17, and the second bottom chamber 15 is communicated with the top chamber 16 via a plurality of outflow blade cooling channels 18. After entering the first bottom chamber 14, the liquid metal enters the top chamber 16 through the inflow blade cooling channel 17, and then enters the second bottom chamber 15 through the outflow blade cooling channel 18. With a plurality of inflow blade cooling channels 17 and outflow blade cooling channels 18, the heat transfer area between the liquid metal and the turbine rotor blade 2 can be increased.

In the present application, the internal flow passage further includes a blade end wall inflow channel and a blade end wall outflow channel, both of which are arranged in the blade end wall 5. The outlet of the blade end wall inflow channel is communicated with the first bottom chamber 14, and the inlet of the blade end wall outflow channel is communicated with the second bottom chamber 15. The liquid metal enters the first bottom chamber 14 through the blade end wall, and flows out of the second bottom chamber 15 through the blade end wall.

In the present application, the internal flow passage further includes a turbine rotor disk inflow channel 1 and a turbine rotor disk outflow channel 3, both of which are arranged in the turbine rotor disk 4. The inlet of the turbine rotor disk inflow channel 1 is communicated with the electromagnetic pump system 12, and the outlet of the turbine rotor disk inflow channel 1 is communicated with the inlet of the blade end wall inflow channel. The outlet of the turbine rotor disk outflow channel 3 is communicated with the radiator 7, and the inlet of the turbine rotor disk outflow channel 3 is communicated with the outlet of the blade end wall outflow channel. The liquid metal flowing out of the electromagnetic pump system 12 enters the blade end wall inflow channel through the turbine rotor disk inflow channel 1, and the liquid metal flowing out of the blade end wall outflow channel enters the radiator 7 through the turbine rotor disk outflow channel 3.

In the present application, the blade end wall inflow channel and the blade end wall outflow channel are bending channels, so as to increase the heat transfer area between the liquid metal and the blade end wall 5.

There are various types of radiator 7, and the skilled in the art can choose based on actual needs. In the present application, the radiator 7 is a fin radiator 7.

Further, in the present application, the electromagnetic pump system 12 includes an electromagnetic pump body 121, an induction power supply stationary component 123, and an induction power supply rotating component 122. The induction power supply stationary component 123 is annular and fixed on the turbine stator disk 19. The induction power supply rotating component 122 is annular and fixed on the electromagnetic pump body. The induction power supply rotating component 122 includes an induction module, and the induction module is electrically connected to the electromagnetic pump body 121. The induction power supply stationary component 123 includes power supply module, and the power supply module supplies power to the induction module by electromagnetic induction. The induction module receives the electric energy supplied by the power supply module by electromagnetic induction and transfers the electric energy to the electromagnetic pump body 121 to supply power to the electromagnetic body. The turbine stator disk 19 is a common part of an aero-engine; the turbine stator disk 19 is coaxial with the turbine rotor disk 4 but fixedly configured on a supporting component, not rotating with the turbine rotor disk 4. The electromagnetic pump body 121 is powered by this wireless power supply method, and the connecting wires between the electromagnetic pump body 121 and the power supply, thus solving the problem of not easy to set the power supply connection cables.

The specific embodiments are used to illustrate the principles and the implementation methods of the present application in the description, and the illustrations of the embodiments mentioned above are only used to help understanding the method and the core idea of the present application; meanwhile, for the skilled in the art, there will be changes in the specific implementation method and scope of application. In summary, the contents of the description should not be understood as a limitation of the present application.

List of Reference Signs: 1—turbine rotor disk inflow channel; 2—turbine rotor blade; 3—turbine rotor disk outflow channel; 4—turbine rotor disk; 5—blade end wall; 6—second connecting pipe; 7—radiator; 8—third connecting pipe; 9—expansion joint; 10—drag reduction cover plate; 11—fourth connecting pipe; 12—electromagnetic pump system; 13—first connecting pipe; 14—first bottom chamber; 15—second bottom chamber; 16—top chamber; 17—inflow blade cooling channel; 18—outflow blade cooling channel; 19—turbine stator disk; 121—electromagnic pump body; 122—induction power supply rotating component; 123—induction power supply stationary component.

What is claimed is:

1. An aero-engine turbine assembly, comprising:
   a turbine assembly body with an internal flow passage, wherein the turbine assembly body comprises a turbine rotor disk, a blade end wall and a turbine rotor blade, which are successively fixedly connected with each other; the internal flow passage passes through the turbine rotor disk, the blade end wall and the turbine rotor blade; and the internal flow passage is provided with an inlet and an outlet; and
   a cooling component fixedly connected on the turbine rotor disk, wherein the cooling component comprises an electromagnetic pump system, an expansion joint and a radiator, which are successively in communication with each other; the electromagnetic pump system is in communication with the inlet to inject liquid metal into the internal flow passage; the radiator is in communication with the outlet to receive the liquid metal flowing out of the outlet.

2. The aero-engine turbine assembly according to claim 1, wherein the inlet and the outlet are located on the turbine rotor disk.

3. The aero-engine turbine assembly according to claim 2, wherein the aero-engine turbine assembly further comprises a drag reduction cover plate configured for reducing wind resistance; the drag reduction cover plate is fixed on the turbine rotor disk and covers an outside of the electromagnetic pump system and the expansion joint; and a side of the drag reduction cover plate away from the turbine rotor disk has a smooth surface.

4. The aero-engine turbine assembly according to claim 2, wherein the electromagnetic pump system is in communication with the inlet via a first connecting pipe, the radiator is in communication with the outlet via a second connecting pipe, the radiator is in communication with the expansion joint via a third connecting pipe, and the expansion joint is in communication with the electromagnetic pump system via a fourth connecting pipe.

5. The aero-engine turbine assembly according to claim 1, wherein the internal flow passage comprises a first bottom chamber, a second bottom chamber, a top chamber, a plurality of inflow blade cooling channels, and a plurality of outflow blade cooling channels, which are arranged in the turbine rotor blade; the first bottom chamber and the second bottom chamber are arranged at a side of the turbine rotor blade close to the blade end wall, and the top chamber is arranged at a side of the turbine rotor blade away from the blade end wall; the first bottom chamber is in communication with the top chamber via the plurality of inflow blade cooling channels, and the second bottom chamber is in communication with the top chamber via the plurality of outflow blade cooling channels.

6. The aero-engine turbine assembly according to claim 5, wherein the internal flow passage further comprises a blade end wall inflow channel and a blade end wall outflow channel, which are arranged in the blade end wall; an outlet of the blade end wall inflow channel is in communication with the first bottom chamber, and an inlet of the blade end wall outflow channel is in communication with the second bottom chamber.

7. The aero-engine turbine assembly according to claim 6, wherein the internal flow passage further comprises a turbine rotor disk inflow channel and a turbine rotor disk outflow channel, which are arranged in the turbine rotor disk; an inlet of the turbine rotor disk inflow channel is in communication with the electromagnetic pump system, and an outlet of the turbine rotor disk inflow channel is in communication with an inlet of the blade end wall inflow channel; an outlet of the turbine rotor disk outflow channel is in communication with the radiator and an inlet of the turbine rotor disk outflow channel is in communication with the blade end wall outflow channel.

8. The aero-engine turbine assembly according to claim 6, wherein the blade end wall inflow channel and the blade end wall outflow channel are bending channels.

9. The aero-engine turbine assembly according to claim 1, wherein the radiator is a fin radiator.

10. The aero-engine turbine assembly according to claim 1, wherein the electromagnetic pump system comprises an electromagnetic pump body, an induction power supply stationary component and an induction power supply rotating component; the induction power supply stationary component is annular and fixed on a turbine stator disk; the induction power supply rotating component is annular and fixed on the electromagnetic pump body; the induction power supply rotating component comprises an induction module, and the induction module is electrically connected with the electromagnetic pump body; the induction power supply stationary component comprises a power supply module, and the power supply module supplies power to the induction module by means of electromagnetic induction; the induction module supplies power to the power supply module by means of electromagnetic induction, and transmits electric energy to the electromagnetic pump body to supply power for the electromagnetic pump body.

* * * * *